United States Patent [19]
Beppu

[11] Patent Number: 5,870,261
[45] Date of Patent: Feb. 9, 1999

[54] MAGNETORESISTIVE HEAD

[75] Inventor: Fumiaki Beppu, Oomuta, Japan

[73] Assignee: Matsushita Electric Industrial Co., Ltd., Osaka, Japan

[21] Appl. No.: 950,840

[22] Filed: Oct. 15, 1997

Related U.S. Application Data

[63] Continuation of Ser. No. 575,841, Dec. 21, 1995, abandoned, which is a continuation of Ser. No. 154,327, Nov. 18, 1993, abandoned.

[30] Foreign Application Priority Data

Nov. 19, 1992 [JP] Japan .................................... 4-310469

[51] Int. Cl.$^6$ ...................................................... G11B 5/39
[52] U.S. Cl. ............................................................ 360/113
[58] Field of Search .................................... 360/113, 126

[56] References Cited

U.S. PATENT DOCUMENTS

| | | | |
|---|---|---|---|
| 3,864,751 | 2/1975 | Beaulieu et al. | 360/113 |
| 4,103,315 | 7/1978 | Hempstead et al. | 360/113 |
| 4,803,580 | 2/1989 | Mowry | 360/113 |
| 4,816,948 | 3/1989 | Kamo et al. | 360/113 |
| 4,833,560 | 5/1989 | Doyle | 360/113 |
| 4,907,114 | 3/1990 | Shiiki et al. | 360/113 |
| 5,001,586 | 3/1991 | Aboaf et al. | 360/113 |
| 5,198,795 | 3/1993 | Shibasaki et al. | 328/32 |
| 5,287,237 | 2/1994 | Kitada et al. | 360/113 |

FOREIGN PATENT DOCUMENTS

| | | |
|---|---|---|
| 574896 | 12/1993 | European Pat. Off. . |
| 50-65213 | 6/1975 | Japan . |

*Primary Examiner*—Stuart S. Levy
*Assistant Examiner*—George J. Letscher
*Attorney, Agent, or Firm*—McDermott, Will & Emery

[57] ABSTRACT

A magnetoresistive head includes a magnetoresistive element and a for-bias soft magnetic film attached to the magnetoresistive element via a spacer. The for-bias soft magnetic film has an axis of easy magnetization which is set to be non-perpendicular to a direction of a bias magnetic field applied to the for-bias soft magnetic film. The bias magnetic field is generated by a sense current flowing in the magnetoresistive element. With this structure, the for-bias soft magnetic film can be easily magnetically saturated so that a reliable characteristic of the magnetoresistive head is ensured. The axis of easy magnetization of the for-bias soft magnetic film may be inclined to the direction of the bias magnetic field by an angle of equal to or less than 60 degrees. Alternatively, the axis of easy magnetization of the for-bias soft magnetic film may be inclined to the direction of the bias magnetic field by an angle of equal to or less than 15 degrees. Alternatively, the axis of easy magnetization of the for-bias soft magnetic film may be set parallel to the direction of the bias magnetic field.

4 Claims, 6 Drawing Sheets

MAGNETORESISTIVE HEAD

This application is a continuation of application Ser. No. 08/575,841 filed Dec. 21, 1995, now abandoned, which is a continuation of Ser. No. 08/154,327 filed on Nov. 18, 1993, now abandoned.

BACKGROUND OF THE INVENTION

1. Field of the Invention

The present invention relates to a magnetoresistive head for use in, for example, a magnetic recording/reproducing device, such as, a magnetic disk unit and a magnetic tape unit.

2. Description of the Prior Art

In the magnetic disk unit, the magnetic tape unit and the like which record and reproduce data, a data recording density has been improved to be higher year after year.

In response to this situation, a magnetoresistive head (hereinafter also referred to as "MR head") has been developed since the MR head is capable of dealing with those data recorded in such a higher density.

On the other hand, in order for the MR head to reproduce an output waveform which precisely corresponds to a magnetic field generated on a magnetic recording medium, it is necessary to operate a magnetoresistive film or layer (hereinafter also referred to as "MR film") in a linear resistance variation region. In order for this, a bias magnetic field should be applied to the MR film.

As one method for applying the bias magnetic field to the MR film, there has been proposed the SAL (soft adjacent layer) bias method which can provide a high bias efficiency with a low current. In the SAL bias method, a for-bias soft magnetic film which is attached to the MR film via a spacer is magnetized by means of a magnetic field generated due to a current flow in the MR film, and a direction of magnetization in the MR film is rotated or angularly changed to be perpendicular to a surface of the MR head confronting the magnetic recording medium (hereinafter also referred to as "medium confronting surface") by means of the magnetized for-bias soft magnetic film.

The effect of the SAL bias method will be described in detail hereinbelow.

FIG. 2 is a graph showing an H-R line representing a relationship between a magnitude of the magnetic field (H) applied or inputted to the MR film as represented by the axis of abscissas and a magnitude of the electric resistance (R) of the MR film as represented by the axis of ordinates. As appreciated from FIG. 2, the electric resistance of the MR film changes depending on a magnitude of the inputted magnetic field. Accordingly, assuming that the inputted magnetic field in FIG. 2 is the magnetic field generated on the surface of the magnetic recording medium, the electric resistance of the MR film changes depending on a condition of the magnetic field on the surface of the magnetic recording medium. Therefore, when a constant current is set to flow in the MR film, the magnetic field recorded on the magnetic recording medium, that is, the recorded magnetic data can be read out by measuring a voltage applied across the MR film. However, as described above, in order to obtain the output waveform which precisely corresponds to the inputted magnetic field, the MR film should be operated in its linear resistance variation region as represented by B in FIG. 2. In FIG. 2, the H-R line is indicated as being shifted leftward by applying the bias magnetic field to the MR film so that the MR film can be operated in the linear resistance variation region B with respect to the inputted magnetic field, meaning that the output waveform which precisely corresponds to the inputted magnetic field, i.e. the recorded magnetic field on the magnetic recording medium can be reproduced. On the other hand, if no bias magnetic field is applied to the MR film, the electric resistance of the MR film is maximum when a magnitude of the inputted magnetic field is substantially 0 (zero), and decreases as a magnitude of the inputted magnetic field increases or decreases from the value 0 (zero). Accordingly, the MR film can not be operated in the linear resistance variation region B with respect to the inputted magnetic field so that the reproduced output waveform differs from the corresponding inputted magnetic field.

FIG. 1 is a partial perspective view showing a conventional MR head.

In FIG. 1, numeral 1 denotes a for-bias soft magnetic film, numeral 2 a nonmagnetic spacer film disposed on the for-bias soft magnetic film 1, numeral 3 an MR film disposed on the nonmagnetic spacer 2, and numeral 4 electrode films for supplying a sense current to the MR film 3. Further, in FIG. 1, alphabet Z represents a direction of an axis of easy magnetization of the for-bias soft magnetic film 1, alphabet Y a direction of an axis of easy magnetization of the MR film 3, alphabet U a flow direction of the sense current, and alphabet V a direction of a magnetic field generated by the sense current flowing in the MR film 3.

It has been found out, however, that the foregoing conventional structure is unsuitable for the size-reduction of the MR head.

Specifically, when reducing a size of the MR head, a thickness of each of the films 1 to 4 should also be reduced. As a thickness of the MR film 3 is reduced, an electric resistance of the MR film 3 is increased. As a result, unless a magnitude of the sense current flowing in the MR film 3 is suppressed to a lower value, the MR film 3 is subject to rupture or disconnection due to heat generation of the MR film 3 itself and to deterioration of its characteristic due to the generated heat.

On the other hand, when the sense current is lowered, a magnitude of a bias magnetic field generated around the MR film 3 is also lowered. As a result, the for-bias soft magnetic film 1 can not be sufficiently magnetized by such a weak bias magnetic field so that a direction of magnetization of the MR film 3 can not be angularly changed to a direction which is perpendicular to a medium confronting surface 5 of the MR head, resulting in distortion of the reproduced output signal.

SUMMARY OF THE INVENTION

Therefore, it is an object of the present invention to provide an improved magnetoresistive head.

Another object of the present invention is to provide a magnetoresistive head which makes it possible to sufficiently magnetize a for-bias soft magnetic film with a lowered sense current so as to reproduce an output signal precisely corresponding to an inputted magnetic field.

According to one aspect of the present invention, a magnetoresistive head comprises a magnetoresistive element; lead means for supplying a sense current to the magnetoresistive element; and a soft magnetic film provided in the vicinity of the magnetoresistive element, the soft magnetic film having an axis of easy magnetization which is set to be non-perpendicular to a direction of a bias magnetic field applied to the soft magnetic film, the bias magnetic field being generated by the sense current flowing in the magnetoresistive element.

The axis of easy magnetization of the soft magnetic film may be inclined to the direction of the bias magnetic field by an angle of equal to or less than 60 degrees or by an angle of equal to or less than 15 degrees, or may be parallel to the direction of the bias magnetic field.

According to another aspect of the present invention, a magnetoresistive head comprises a substrate; a reproducing section having a magnetoresistive element and a soft magnetic film attached to the magnetoresistive element via a spacer, the reproducing section provided on the substrate; and lead means for supplying a sense current to the reproducing section, the soft magnetic film having an axis of easy magnetization which is set to be non-perpendicular to a direction of a bias magnetic field applied to the soft magnetic film, the bias magnetic field being generated by the sense current flowing in the magnetoresistive element.

The axis of easy magnetization of the soft magnetic film may be inclined to the direction of the bias magnetic field by an angle of equal to or less than 60 degrees or by an angle of equal to or less than 15 degrees, or may be parallel to the direction of the bias magnetic field.

According to still another aspect of the present invention, a magnetoresistive head comprises a reproducing section having a magnetoresistive element and a for-bias soft magnetic film attached to the magnetoresistive element via a spacer; lead means for supplying a sense current to the reproducing section; a pair of shield films each formed of a soft magnetic material, the shield films being provided so as to interpose the reproducing section and the lead means therebetween; an upper core attached to at least one of the shied films via a gap film working as a magnetic gap; and a coil layer provided between the upper core and the gap film, the for-bias soft magnetic film having an axis of easy magnetization which is set to be non-perpendicular to a direction of a bias magnetic field applied to the for-bias soft magnetic film, the bias magnetic field being generated by the sense current flowing in the magnetoresistive element.

The axis of easy magnetization of the for-bias soft magnetic film may be inclined to the direction of the bias magnetic field by an angle of equal to or less than 60 degrees or by an angle of equal to or less than 15 degrees, or may be parallel to the direction of the bias magnetic field.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Now, preferred embodiments of the present invention will be described hereinbelow with reference to the accompanying drawings.

Figure 3:
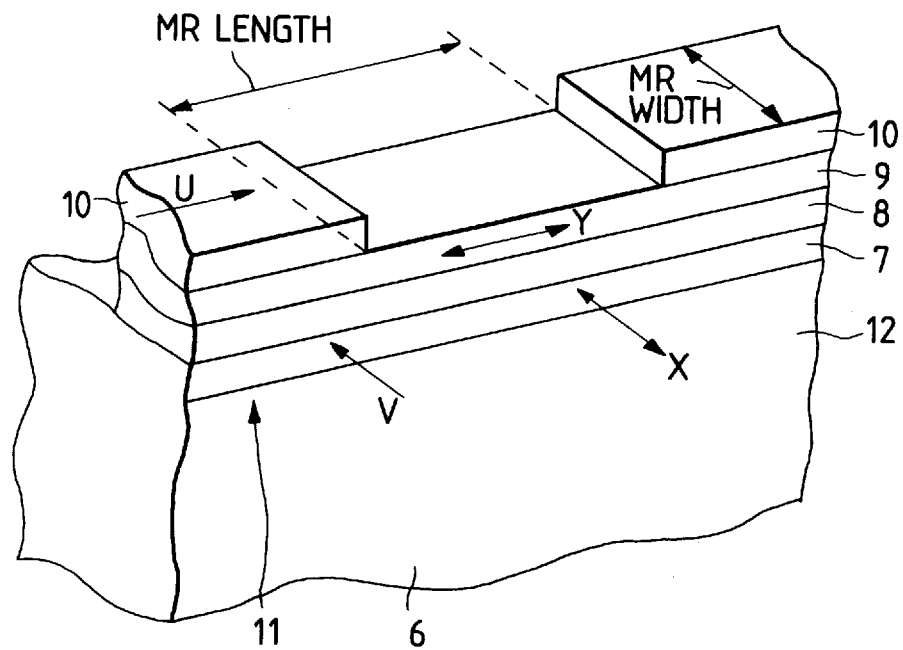
FIG. 3 is a partial perspective view showing a layered structure of an MR head according to a first preferred embodiment of the present invention, wherein a relationship among a flow direction of a sense current, a direction of a magnetic field generated by the sense current, a direction of an axis of easy magnetization of the MR film and a direction of an axis of easy magnetization of a for-bias soft magnetic film is indicated.
Figure 4:
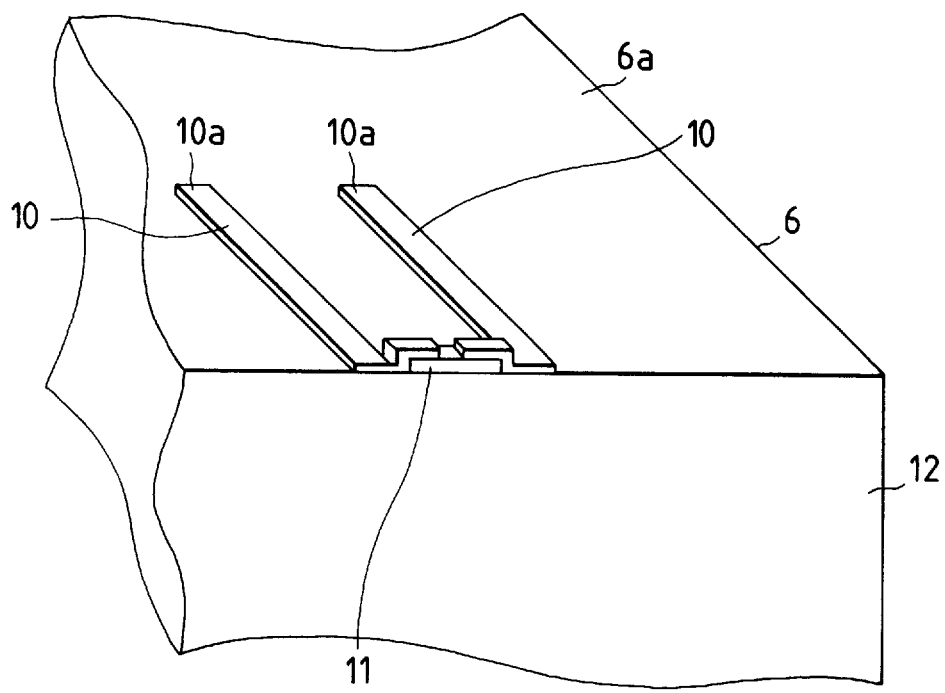
FIG. 4 is a partial perspective view showing the MR head of FIG. 3.

FIG. 3 is a partial perspective view showing a layered structure of an MR head according to a first preferred embodiment of the present invention, and FIG. 4 is a partial perspective view showing the MR head of FIG. 3.

In FIGS. 3 and 4, numeral 6 denotes a substrate formed of a ceramic material, such as, $Al_2 O_3$ TiC or Mn-Zn ferrite. The substrate 6 has a film forming surface 6a which is a mirror finished surface having a roughness of equal to or less than several tens of angstroms (Å). Numeral 7 denotes a for-bias soft magnetic film (hereinafter also referred to as "bias film") formed on the film forming surface 6a. The bias film 7 is formed of a soft magnetic material, such as, CoZrMo amorphous alloy, having a thickness of about 200Å to 500Å. It is to be noted that, in this preferred embodiment, a direction X of an axis of easy magnetization of the bias film 7 is substantially perpendicular to a surface 12 of the MR head confronting a magnetic recording medium, such as, a magnetic disk (hereinafter also referred to as "medium confronting surface"). Numeral 8 denotes a spacer film formed on the bias film 7. The spacer 8 film is formed of $SiO_2$, Ti, Ta or the like, having a thickness of about 100Å to 300Å. Numeral 9 denotes an MR film formed on the spacer film 8. The MR film 9 is formed of a material showing a magnetoresistance effect, such as, Ni-Fe, having a thickness of about 200Å to 500Å. The MR film 9 is formed by the sputtering in a magnetic field of about 50 Oe (oersted) to 200 Oe. The bias film 7, the spacer film 8 and the MR film 9 constitute a reproducing section 11 of the MR head. Numerals 10, 10 denote a pair of lead films provided on the reproducing section 11 as being separate from each other, i.e. as being out of contact with each other. Each lead film 10 is formed of a conductive material, such as, gold or tungsten, having a thickness of about 2000Å to 3000Å. Lead wires (not shown) are respectively connected to rear or upper ends 10a, 10a of the lead films 10, 10 by, such as, bonding. A constant sense current is set to flow in the reproducing section 11 via the lead wires and the lead films 10, 10. Alphabet U represents a direction of the constant sense current flowing in the reproducing section 11.

It may be arranged that a protective film formed of, such as, $SiO_2$ is provided as covering the reproducing section 11 and the lead films 10, 10 except for their rear ends 10a, 10a.

Now, operations of this preferred embodiment as structured above will be described hereinbelow.

Figure 2:
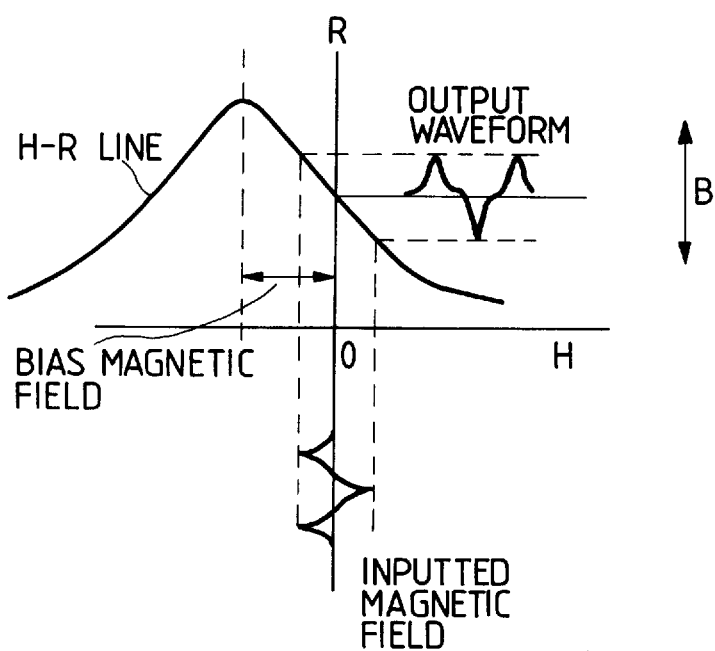
FIG. 2 is a graph showing a relationship between an external magnetic field applied to an MR film and a corresponding resistance variation of the MR film.

When the constant sense current flows in the MR film 9 via the lead films 10, 10, a bias magnetic field is generated around the MR film 9. This bias magnetic field is applied to the bias film 7 in a direction V as shown in FIG. 3 so that magnetization in the bias film 7 is directed along the direction V of the bias magnetic field. As a result, magnetization in the MR film 9 is also directed along a direction perpendicular to the medium confronting surface 12. In this preferred embodiment, by adjusting the magnetization in the MR film 9 to be directed in perpendicular to the medium confronting surface 12, the MR film 9 is allowed to be operated in the linear resistance variation region B as indicated in the graph of FIG. 2 so that the reliable reproducing characteristic can be ensured.

Figure 1:
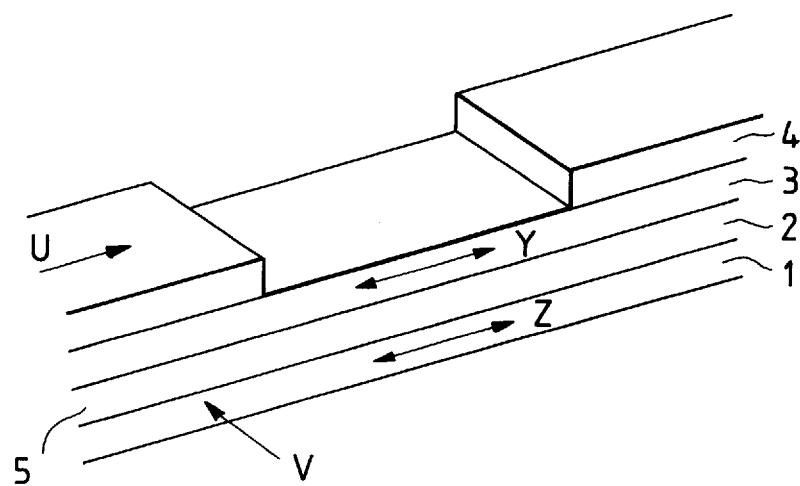
FIG. 1 is a partial perspective view showing a conventional MR head.

In this preferred embodiment, what is to be particularly noted is that the direction X of the axis of easy magnetization of the bias film 7 is set perpendicular to the medium confronting surface 12, that is, perpendicular to the flow direction U of the sense current, as opposed to the prior art of FIG. 1. By setting the direction X of the axis of easy magnetization of the bias film 7 in this manner, even when a magnitude of the sense current flowing in the MR film 9 is limited to weaken the bias magnetic field generated around the MR film 9, the magnetization of the bias film 7 can be directed so as to be perpendicular to the medium confronting surface 12 so that the magnetization of the MR film 9 can also be directed to be perpendicular to the medium confronting surface 12 by means of the magnetized bias film 7.

Now, a method of forming the bias film 7 according to this preferred embodiment will be described hereinbelow.

Referring to the prior art of FIG. 1, in the conventional method, while the MR film 3 is formed using the thin-film forming technology by applying a magnetic field along the flow direction of the sense current, not only the axis of easy magnetization of the MR film 3 but also the axis of easy magnetization of the for-bias soft magnetic film 1 are formed along the flow direction of the sense current.

Figure 5A:
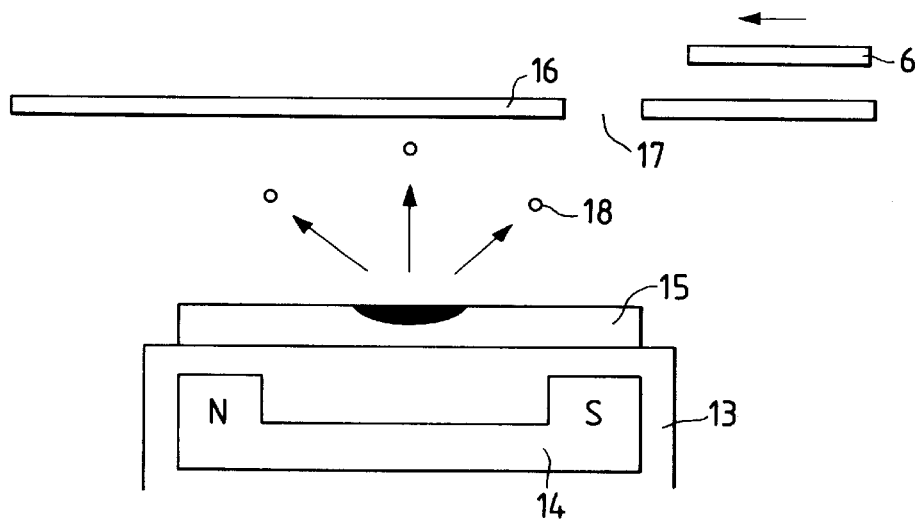
FIG. 5(A) is a diagram schematically showing a sputtering apparatus for forming the for-bias soft magnetic film on a substrate of the MR head according to the first preferred embodiment.
Figure 5B:
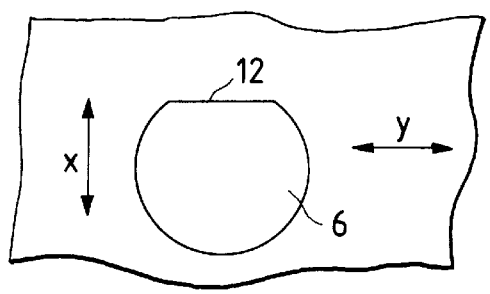
FIG. 5(B) is a diagram showing the substrate as seen from above in the sputtering apparatus of FIG. 5(A)

In consideration of this, the bias film 7 is formed in the following manner in this preferred embodiment:

FIG. 5(A) is a diagram schematically showing a sputtering apparatus for forming the bias film 7 on the substrate 6, and FIG. 5(B) is a diagram of the substrate 6 as seen from above in the sputtering apparatus of FIG. 5(A), along with the directions X and Y, wherein the substrate 6 is moved leftward along the direction Y in the sputtering apparatus.

In FIG. 5(A), numeral 13 denotes an electrode in which a permanent magnet 14 is provided. On the electrode 13, a target 15 formed of a material of the bias film 7 is mounted. Numeral 16 denotes a plate having a through hole 17 for determining an incident angle of sputtering particles 18 forced out from the target 15 onto the substrate 6. The above-noted members are arranged in a chamber (not shown) filled up with inert gas or a mixture of inert gas and other gas at a given sputtering gas pressure.

In the RF sputtering apparatus as structured above, the substrate 6 is moved with the plate 16 interposed between the substrate 6 and the electrode 13 so as to pass over the through hole 17 of the plate 16. It is essential not to locate the through hole 17 over the center of the electrode 13 so as to prevent the sputtering particles 18 from hitting the substrate 6 at a right incident angle. Accordingly, the sputtering particles 18 from the target 15 are incident onto the substrate 6 at a predetermined inclined angle so as to form the bias film 7 on the substrate 6. As a result, the axis of easy magnetization of the bias film 7 is formed along the direction X which is perpendicular to the direction Y, that is, to the moving direction of the substrate 6. This means that, by setting the medium confronting surface 12 to be perpendicular to the direction X, the axis of easy magnetization of the bias film 7 can be set perpendicular to the medium confronting surface 12. A moving speed of the substrate, a sputtering gas pressure, a kind of gas to be used, an electric power and the like may be respectively selected to optimal values depending on anisotropy required for the bias film 7. When the bias film 7 is formed with anisotropy as in this preferred embodiment, the axis of easy magnetization of the bias film 7 is not directed along the sense current flow direction U even if the MR film 9 is formed in the magnetic field afterward.

Now, a preferable range of inclination of the axis of easy magnetization of the bias film 7 relative to the sense current flow direction U will be described hereinbelow.

Figure 6:
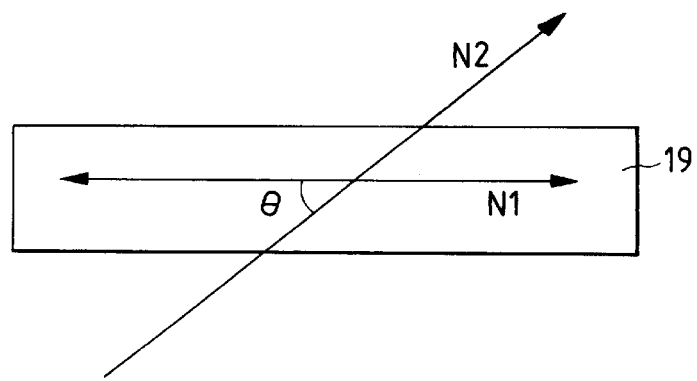
FIG. 6 is a diagram showing a direction of an axis of easy magnetization of a soft magnetic film and a direction of an external magnetic field applied to the soft magnetic film.
Figure 7:
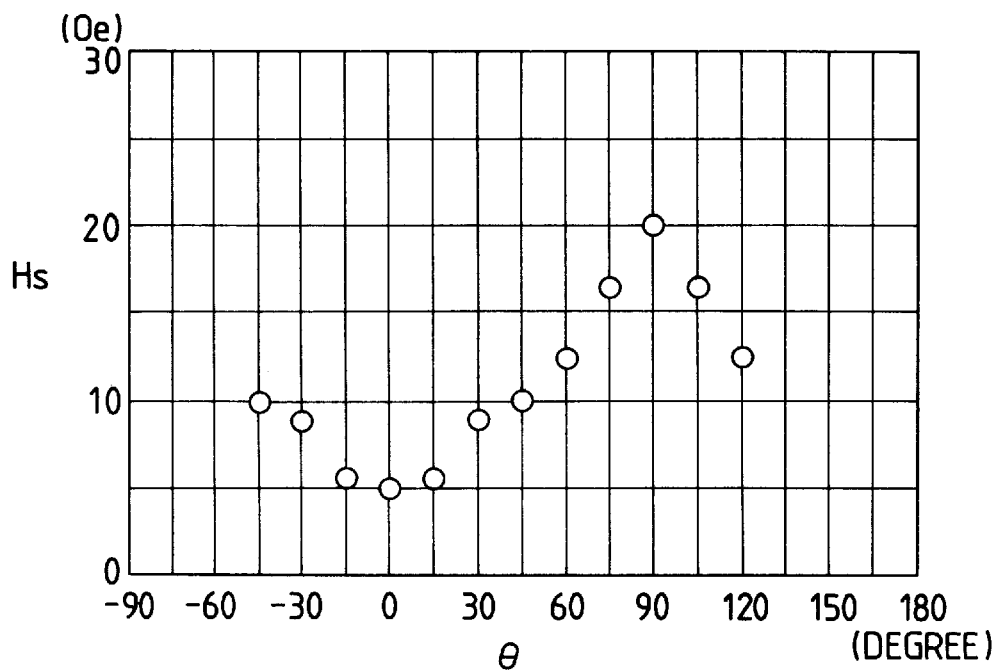
FIG. 7 is a diagram showing a relationship between an angle θ between the direction of the axis of easy magnetization of the soft magnetic film and the direction of the external magnetic field applied to the soft magnetic film and a magnitude of Hs.

As shown in FIG. 6, a soft magnetic film 19 of a Co-based amorphous material having a thickness of about 300Å was formed on the substrate (not shown). It is assumed that the axis of easy magnetization of the soft magnetic film 19 is formed in a direction N1 in FIG. 6. Then, a magnitude of Hs (a magnetic field when magnetization is saturated) was measured by applying an external magnetic field to the soft magnetic film 19 at various angles. A direction of the external magnetic field is represented by N2 in FIG. 6, and an angle between the directions N1 and N2 is represented by θ. The magnitude of Hs was measured using a B-H measuring device (trade name: HYSTROSCOPE, manufactured by Nippon Scientific Engineering Co., Ltd.). A relationship between θ and Hs is shown in FIG. 7. As appreciated from FIG. 7, when θ is 0 (zero) degree, that is, when the external magnetic field is applied to the soft magnetic film 19 in parallel with the direction N1 of the axis of easy magnetization of the soft magnetic film 19, Hs becomes minimum. On the other hand, as θ deviates from 0 (zero) degree toward a right angle, Hs increases.

When this measurement result is applied to the MR head, the external magnetic field is considered as the bias magnetic field generated by the sense current flowing in the MR film 9 and the soft magnetic film 19 is considered as the bias film 7. As a result, the following conclusion is reached. Specifically, when the direction of the axis of easy magnetization of the bias film 7 is non-perpendicular to the direction of the bias magnetic field (that is, the direction of the axis of easy magnetization of the bias film 7 is non-parallel with the sense current flow direction), the bias film 7 can be magnetically saturated with a less magnitude of the bias magnetic field. Further, when the absolute value of an angle θ between the axis of easy magnetization of the bias film 7 and the direction of the bias magnetic field is equal to or less than the absolute value of ±60 degrees, the bias film 7 can be magnetically saturated with a sufficiently small magnitude of the bias magnetic field. Further, when the absolute value of an angle θ between the axis of easy magnetization of the bias film 7 and the direction of the bias magnetic field is equal to or less than the absolute value of ±15 degrees, the bias film 7 can be magnetically saturated with a very small magnitude of the bias magnetic field.

Figure 8:
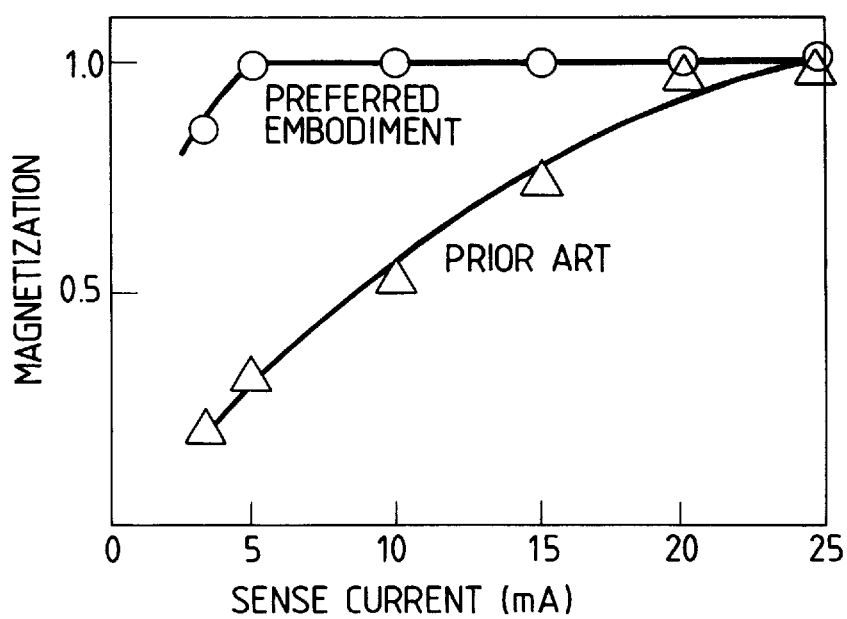
FIG. 8 is a graph showing a relationship between the sense current flowing in the MR film and the magnetic saturation of the for-bias soft magnetic film, comparing the MR head according to the first preferred embodiment and the conventional MR head.

Now, a relationship between a magnitude of the sense current and a degree of magnetization of the bias film 7 will be described with reference to FIG. 8, comparing the MR head of FIG. 3 according to this preferred embodiment and the conventional MR head of FIG. 1.

As described above, in this preferred embodiment, the axis of easy magnetization of the bias film 7 is formed perpendicular to the flowing direction of the sense current, on the other hand, in the prior art, the axis of easy magnetization of the bias film 1 is formed parallel to the flowing direction of the sense current. As appreciated from FIG. 8, in the prior art, the magnetic saturation of the bias film 1 can only be accomplished with the sense current equal to or greater than 25 mA. On the other hand, in this preferred embodiment, the bias film 7 is magnetically saturated with the sense current of only about 5 mA. Recently, a thickness of the MR film 9 has been reduced in response to, such as, size-reduction of the MR head so that the MR film 9 may be damaged due to its own heat with the sense current equal to or greater than 15 mA. Accordingly, the sense current should be suppressed to less than 15 mA which, however, can not achieve the magnetic saturation of the bias film 1 of the conventional MR head so that the reproducing characteristic of the MR head is deteriorated. On the other hand, in this preferred embodiment, the magnetic saturation of the bias film 7 can be fully achieved with the sense current lower than 15 mA so that the reproducing characteristic of the MR head is never deteriorated.

Now, a second preferred embodiment of the present invention will be described with reference to FIGS. 9 and 10, wherein an MR head as structured similar to that in the first preferred embodiment is provided with a recording head element.

Figure 9:
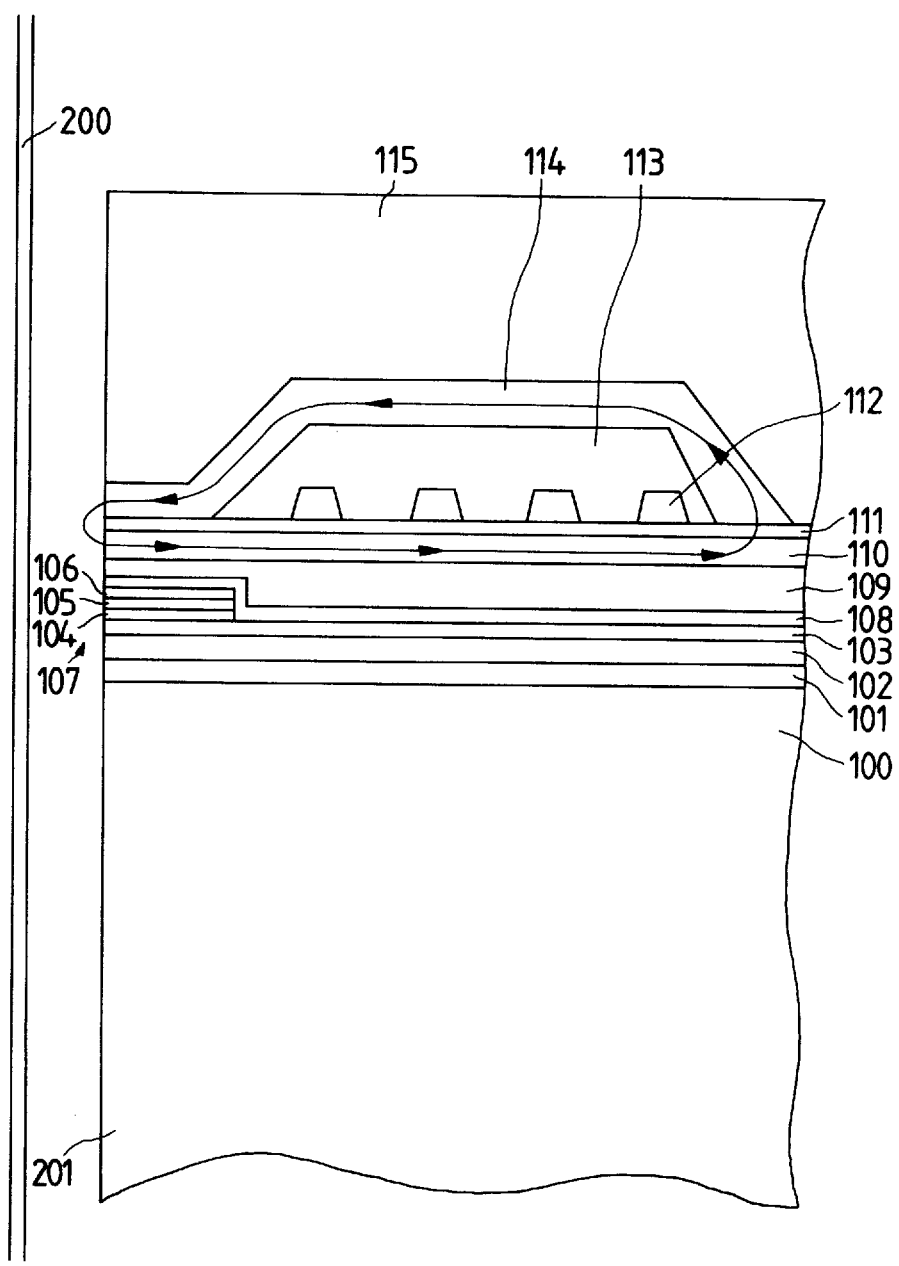
FIG. 9 is a partial sectional view of an MR head with a recording head element, according to a second preferred embodiment of the present invention.
Figure 10:
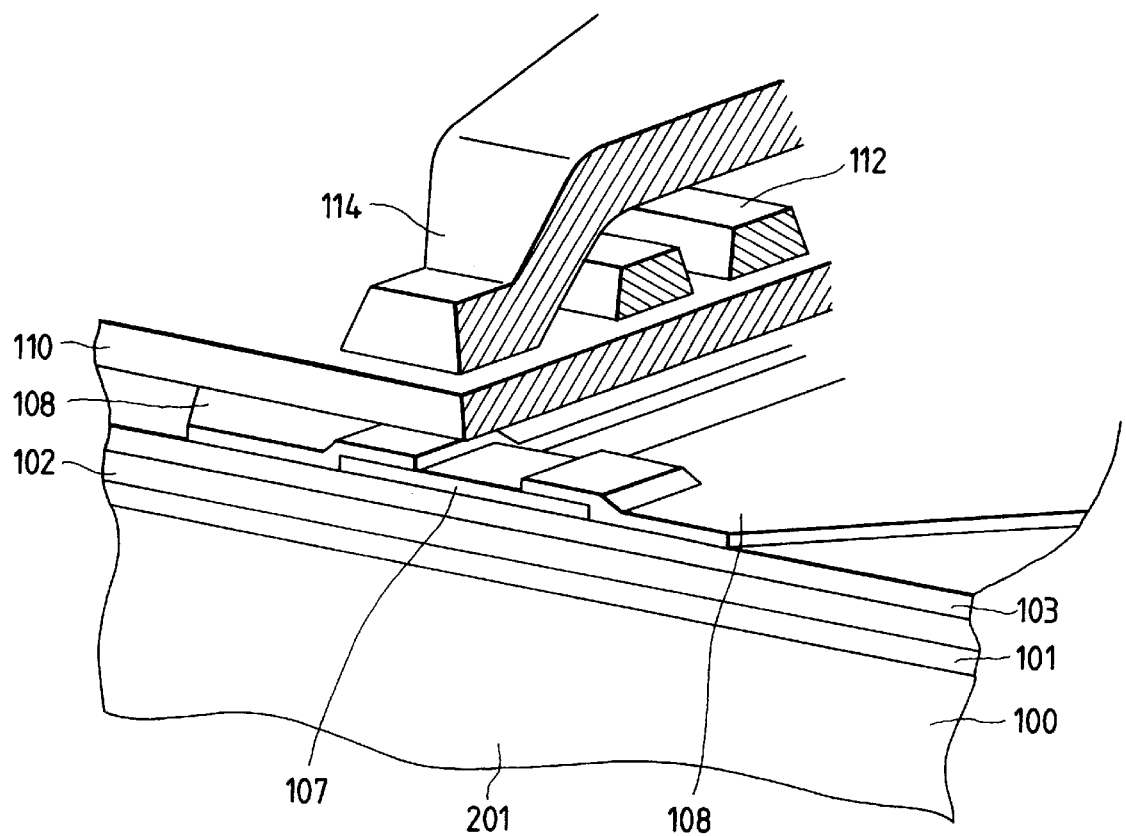
FIG. 10 is a partial perspective view of the MR head with the recording head element as shown in FIG. 9.

FIG. 9 is a partial sectional view of the MR head with the recording head element, and FIG. 10 is a partial perspective view of the MR head with the recording head element as shown in FIG. 9.

In FIGS. 9 and 10, numeral 100 denotes a substrate formed of a ceramic material, such as, $Al_2O_3$ TiC or Mn-Zn ferrite. A film forming surface of the substrate 100 is a mirror finished surface having a roughness of equal to or less than several tens of angstroms (Å). Numeral 101 denotes an insulating film formed on the film forming surface of the substrate 100 by applying, such as, the sputtering to an insulating material, such as, $SiO_2$. The insulating film 101 is mirror-finished so as to have a thickness of several micrometers ($\mu$m). Numeral 102 denotes a shield film provided on the mirror finished surface of the insulating film 101. The shield film 102 is formed of a soft magnetic material, such as, Sendust or permalloy, having a thickness of about 1 $\mu$m to 5 $\mu$m. When the shield film 102 is formed of Sendust, the sputtering is performed. On the other hand, when the shield film 102 is formed of permalloy, the plating is performed. Numeral 103 denotes an insulating film formed on the shield film 102. The insulating film 103 is formed by applying the sputtering to an insulating material, such as, $SiO_2$ so as to have a thickness of about 1000Å to 3000Å. Numeral 104 denotes a bias film formed on the insulating film 103. The bias film 104 is formed of a soft magnetic material, such as, CoZrMo amorphous alloy, having a thickness of about 200Å to 500Å. An axis of easy magnetization of the bias film 104 is formed as being substantially perpendicular to a medium confronting surface 201 facing a magnetic disk 200, that is, substantially parallel to a direction of a bias magnetic field generated by a sense current flowing in an MR film 106. Numeral 105 denotes a spacer film formed on the bias film 104. The spacer film 105 is formed of, such as, $SiO_2$, Ti or Ta, having a thickness of about 100Å to 300Å. Numeral 106 denotes the MR film formed on the spacer film 105. The MR film 106 is formed of a material showing a magnetoresistance effect, such as, Ni-Fe, having a thickness of about 200Å to 500Å. The MR film 106 is formed by the sputtering in a magnetic field of about 50 Oe to 200 Oe. The bias film 104, the spacer film 105 and the MR film 106 constitute a reproducing section 107 of the MR head. Numerals 108, 108 denote a pair of lead films provided on the reproducing section 107 and the insulating film 103 as being separate from each other, i.e. as being out of contact with each other. Each lead film 108 is formed of a conductive material, such as, gold or tungsten, having a thickness of about 2000Å to 3000Å. The structure of the reproducing section 107 is substantially the same as that of the reproducing section 11 as shown in FIG. 3 such that the axis of easy magnetization of the bias film 104 is set substantially parallel to the direction of the bias magnetic field generated by the sense current flowing in the MR film 106. Numeral 109 denotes an insulating film provided as covering the reproducing section 107 and the lead films 108, 108. A material of and a forming method of the insulating film 109 is substantially the same as those of the insulating film 103. Numeral 110 denotes a shield film provided on the insulating film 109. A material of and a forming method of the shield film 110 are substantially the same as those of the shield film 102. Numeral 111 denotes a gap film formed on the shield film 110. The gap film 111 works as a magnetic gap and is formed by applying the sputtering to a nonmagnetic material, such as, $SiO_2$. Numeral 112 denotes a coil film provided on the gap film 111. The coil film 112 is formed of a conductive material, such as, copper or gold by performing the plating. Numeral 113 denotes a layer insulating film provided as covering the coil film 112. The layer insulating film 113 is formed of, such as, a photoresist. Numeral 114 denotes an upper core provided on the layer insulating film 113 for forming a magnetic circuit with the shield film 110 so as to provide the recording head element. The upper core 114 is formed of a soft magnetic material, such as, permalloy or Sendust. Numeral 115 denotes a protective film provided on the upper core 114. The protective film 115 is formed of a material, such as, $SiO_2$.

It may be arranged that the gap film 111, the coil film 112, the layer insulating film 113 and the upper core 114 are provided on the shield film 102 rather than on the shield film 110, or on each of the shield films 102 and 110.

It is to be understood that this invention is not to be limited to the preferred embodiments and modifications described above, and that various changes and modifications may be made without departing from the spirit and scope of the invention as defined in the appended claims.

What is claimed is:

1. A magnetoresistive head comprising:
    a reproducing section having a confronting surface which confronts a recording medium, and a side surface which extends essentially perpendicularly to the confronting surface, and including:
    a magnetoresistive element,
    a soft magnetic film for biasing a direction of magnetization in said magnetoresistive element, and
    a spacer, said soft magnetic film being attached to said magnetoresistive element via said spacer;
    a pair of lead means for supplying a sense current to said reproducing section, said pair of lead means being attached to and electrically contacting said reproducing section on the side surface and remote from a substrate which extends essentially perpendicularly to the confronting surface, said pair of lead means being out of contact with each other;

a pair of shield films each formed of a soft magnetic material, said shield films being provided so as to interpose said magnetoresistive element, soft magnetic film and spacer of said reproducing section and said pair of lead means therebetween;

an upper core attached to at least one of said shield films via a gap film working as a magnetic gap, said at least one of said shield films forming a lower core; and a coil layer provided between said upper core and said gap film, said for-bias soft magnetic film having an axis of easy magnetization which is set to be non-perpendicular to a direction of a bias magnetic field applied to said soft magnetic film, said bias magnetic field being generated by said sense current in said magnetoresistive element wherein said axis of easy magnetization of said for-bias film is inclined to said direction of the bias magnetic field by an angle of equal to or less than 60 degrees, wherein said for-bias film is magnetically saturated with a small magnitude of the bias magnetic field.

2. The magnetoresistive head as set forth in claim 1, wherein said axis of easy magnetization of said for-bias soft magnetic film is inclined to said direction of the bias magnetic field by an angle of equal to or less than 15 degrees.

3. The magnetoresistive head as set forth in claim 1, wherein said axis of easy magnetization of said for-bias soft magnetic film is parallel to said direction of the bias magnetic field.

4. The magnetoresistive head as set forth in claim 1, wherein said for-bias soft magnetic film is formed of an amorphous magnetic material.

* * * * *